Patented July 12, 1932

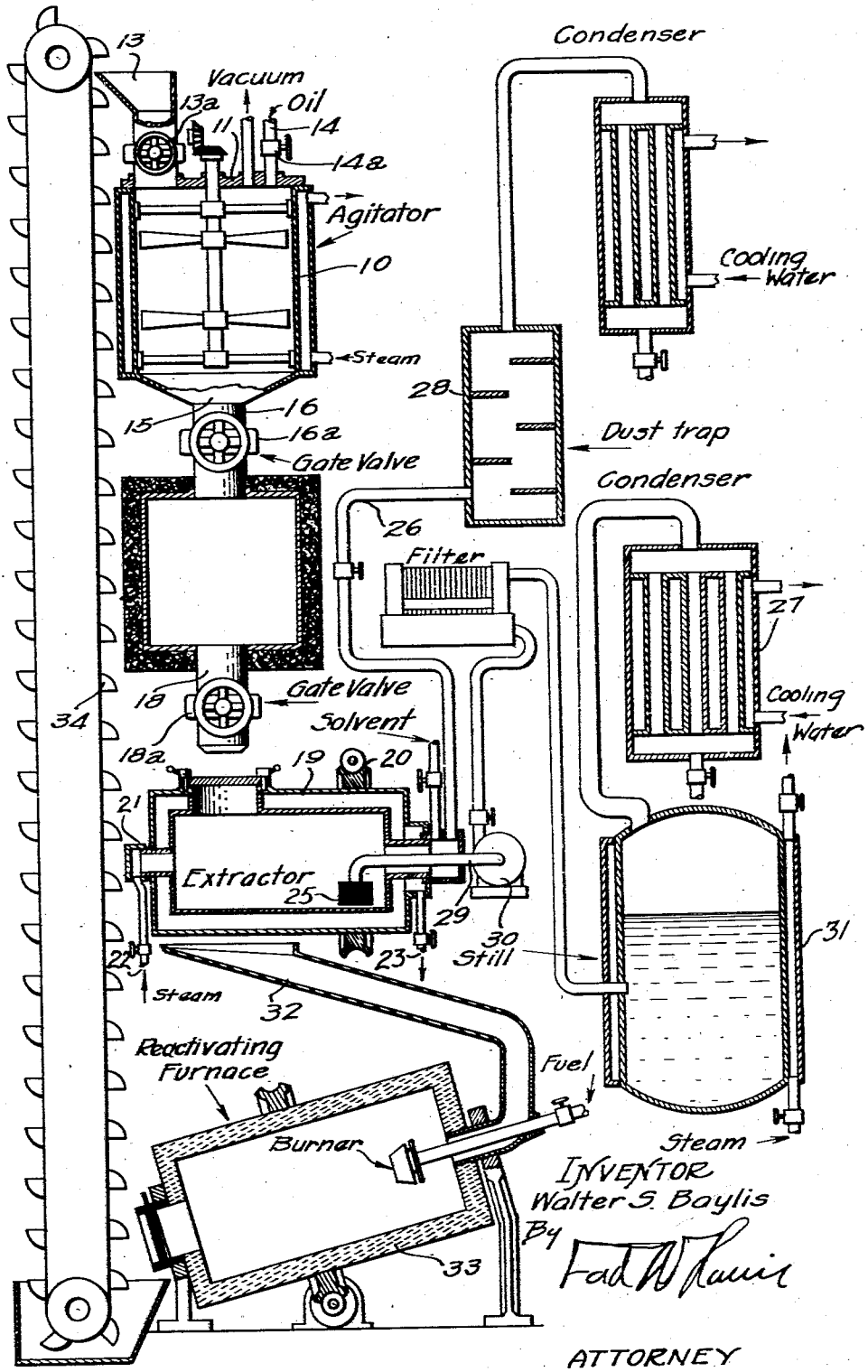

1,866,591

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, A CORPORATION OF CALIFORNIA

PROCESS OF MAKING A SUPERIOR OIL

Application filed September 4, 1928. Serial No. 303,701.

This invention relates to a process by which in the preferred form it is possible to produce a petroleum lubricating or transformer oil which has a lower Sligh test, a better sludging test, and less carbon residue, than any oil which can be produced from similar raw materials by any process of which I am aware.

If it is not desired to produce oil of such a high grade, I may produce an oil equal to the usual commercial grades of today from a lower grade of raw materials. In case the best grade of oil is to be made, the starting material is preferably a distilled lubricating stock which may be of thick, thin, or medium body. In case an ordinary to very good grade of oil is to be made by my process, I start with what is known as a "long residuum", the still bottoms of an oil which has not been distilled down very far. Such material may vary greatly in composition and boiling point according to whether a heavy or medium grade of oil is to be produced.

My process requires special apparatus for commercial scale productions, but it is to be understood that the apparatus illustrated in the accompanying drawing is not the only one in which the process may be practiced.

Referring to the drawing, the figure shows, in side elevation, and more or less diagrammatically, the preferred apparatus.

In the figure, 10 is a steam-jacketed agitating tank, capable of withstanding considerable pressure. Its head 11 accommodates two pipes 13 and 14, 13 of large diameter, for introducing a powdered adsorbent, and 14 for introducing oil. These pipes are provided with shut-off valves 13a and 14a respectively. The bottom of the tank is provided with a very large bottom discharge opening 15. It should be twelve inches or more wide. An inlet pipe 16, of equal width, connects the opening 15 with the top of a reaction chamber 17. In the pipe 16, there is a gate valve 16a.

The reaction chamber is merely a vessel unprovided with any agitating gear, but having a large inlet 16 and an equally large outlet 18, having therein a gate valve 18a. More than one reaction chamber may be provided to serve one agitating tank. Heat insulation or a steam jacket may be provided for the reaction chamber.

The outlet 18 of the reaction chamber is arranged to discharge into an extractor 19 of the kind known as the Wilhelm type. Such extractors are described in U. S. Patents 1,418,503 and 1,611,095 to Karl F. Wilhelm. The apparatus shown in either patent may be used. I prefer to use an extractor not more than 13 feet long 6 feet in diameter, and holding not more than 5 tons of an oil-clay mixture.

The extractor is provided with a gear or pulley 20 by which its shell may be rotated about its axle 21. The axle is hollow and accommodates piping for a steam inlet 22 and steam outlet 23. The other end forms an inlet 24 for a liquid solvent, while 25 is an exit for mixed oil and solvent. 26 is an outlet from the extractor for solvent vapors, leading to a condenser 27. In the pipe 26, there is a dust trap 28.

The outlet pipe 29, for mixed oil and solvent, contains a pump 30 and leads to a still 31, capable of separating accurately, in connection with the condenser 27, the mixture of oil and light solvent which is distilled in the still 31.

32 is any suitable conveying means by which a dry powder may be conveyed from the extractor 19 to a reactivating furnace 33. The latter is preferably of the Herreshoff type, but may be a rotary cylindrical kiln. From the discharge end of the kiln, a conveyor 34, capable of handling a powder, is provided.

The operation of the process is as follows:

A charge of not more than 2½ tons of lubricating stock or long residuum is run into the agitating tank 10, and a preferably equally heavy charge of an acid-activated clay is added. The oil may be preferably slightly acid with $H_2SO_4$. The proportion of oil to earth may range from about 20% to 150% by weight, depending on how much of the oil can be absorbed at high temperatures by the adsorbent. The kind of adsorbent which I prefer to use is the sulphuric acid-activated clay known commercially as "Filtrol".

While this clay is preferred, on account of its superior adsorbent qualities, any good activated clay may be used, such as that made according to the United States Patent No. 1,397,113 to P. W. Prutzman. Silica gel is also suitable.

The mingled oil and clay, which forms a mush or mud, is now heated, by means of the steam jacket, to from 200° F. to 750° F., the higher temperatures being used for the more viscous and higher boiling oils. The agitator is continually kept in motion during the heating. The time of heating is not important, the period in which the charge can reach the desired temperatures within the indicated range being sufficient. The agitator is then stopped, the gate valve 18a closed and 16a opened, and the charge dropped into the reaction chamber 17 while still hot.

Since the object of the mixing with the clay is to take colloidal impurities out of the oil, and this reaction requires time and heat, it follows that the charge must be kept at a high temperature until this purification is accomplished. The charge is therefore allowed to cool in the reaction chamber for ten hours or more; the longer it takes in cooling, the better for the purity of the final product. This time is of course limited by practical considerations of output, so that ten hours may be taken as a practical commercial period although a week's heating would probably cause no injury to the oil. The reaction chamber is preferably heat insulated to just such an extent that at the end of ten hours the clay will not be greatly (if at all) above the boiling point of the solvent when the latter is added to the clay in the extractor, nor much below that point.

When it is desired to discharge the reacted mass into the extractor, the valve 18a is opened, the discharge then taking place by gravity. As soon as this is complete, the valve 18a is again closed and a suitable charge of a special solvent run into the extractor. It is impossible to prescribe exactly how much solvent is to be used, since the quantity is influenced by the kind of oil desired, the kind of oil under process, and the quality of the adsorbent. In general, however, the amount of solvent should approximate four times the amount of oil processed, by weight.

The kind of solvent used is of extreme importance, since its function is to be that of being selective in its action. It should dissolve the oil retained within the pores of the adsorbent, but it should not extract the coloring matter and other colloidal impurities adsorbed on the walls of those pores. A liquid which performs this function in a very satisfactory manner is a benzine of Pennsylvania origin which is free from aromatic compounds and which begins to boil at 140° F. (60° C.) and has its end or dry point at 221° F. (105° C.). This solvent is a regularly produced cut of Pennsylvania crude. Other benzines or naphthas of different origin will be just as satisfactory if their distillation range is approximately the same and if they are originally free from or have been artificially completely freed from aromatic hydrocarbons.

In the extractor, the oily clay is tumbled with warm solvent until all or nearly all of the oil has been dissolved in the benzine. Rotation is then stopped and after a short settling period the pump 30 is operated, thus pumping solvent through the extractor and transferring mixed oil and benzine to a filter and then to the still 31. Any suitable number of extractions may be performed. The pump 30 is then stopped and the temperature of the extractor raised to above the boiling point of the solvent by means of the steam jacket. Distillation of the residual solvent now takes place through the vapor pipe 26 and the dust trap 28 into the condenser 27. Distillation from the still 31 may be practiced at the same time, but the resulting vapors are preferably led to separate condensers. The results of distilling are that pure oil is left in the still 31, from which it may be run to storage. If desired, continuous extraction apparatus can be used without departing from the spirit of the invention.

The residual clay now left in the extractor is wholly free from solvent and the amount of oil left in it is small. It is therefore in excellent condition for reactivation. The chute 32 transfers it to the reactivating furnace 33 in which it is heated to such a temperature and for such a length of time as to burn out all organic matter and carbon, but not so highly as to sinter, glaze, or slag the clay. Persons skilled in the art are capable of performing this step without further directions.

The clay is now in a condition nearly as good as, if not better than, when first used, this statement being particularly true if "Filtrol" has been used. It is conveyed back to the agitating tank 10 by the conveyor 34 and may be reused in the process with or without an admixture of fresh clay, moisture and acid.

It will be seen, therefore, that I have provided a process in which the benefits of the thorough action of a large amount of efficient adsorbent may be realized, without material waste of said adsorbent.

While I have described my process as being applied to mineral oil, I do not limit myself thereto. My invention may be practiced on vegetable oils, for example, cottonseed, linseed, coconut and soy-bean oil, animal fats, fish oils, and even waxes such as paraffin and ozokerite. In doing so, any appropriate solvent may be used and full advantage may be taken of the known properties of various solvents. The test of appropriateness is whether the solvent will dissolve the desired oil without dissolving the coloring matter and other adsorbed impurities out of the adsorbent. The term "oil" as used in the claims is to be interpreted broadly enough to cover mineral, animal and vegetable oils, fats and waxes, both crude and refined.

I claim as my invention:

1. In the process of refining oil, the steps which comprise mixing an acid-activated powdered clay adsorbent with from about 20% to 150% by weight of the oil to be refined, heating the mixture to from 200° F. to 750° F., cooling the mixture from said temperatures in not less than ten hours, extracting the cooled mass with a solvent capable of removing the oil, but not the coloring matter from the adsorbent, separating the oil-laden solution from the solid matter and then recovering the solvent from the oil.

2. A process according to claim 1 in which the solvent is a Pennsylvania benzine.

3. A process according to claim 1 in which the solvent is a benzine free from aromatic hydrocarbons.

4. In the process of refining oil, the steps which comprise mixing an acid-activated powdered clay adsorbent with about 20% to 150% by weight of the oil to be refined, said oil being slightly acid with $H_2SO_4$, heating the mixture to from 200° F. to 750° F., allowing the mixture to cool in not less than ten hours, extracting the mixture with a solvent capable of taking out the oil but not the coloring matter, taking out solid matter from the oil-laden solution and then separating the oil and solvent.

5. A process according to claim 4 in which the unrefined oil is a mineral lubricating oil stock.

6. In a process of refining oil, the steps which comprise mixing an activated mineral fine pored adsorbent with about 20% to 150% of the oil stock to be refined, heating the mixture to between 200° F. and 750° F., allowing t e mixture to cool in not less than ten hours, and separating the oil from the adsorbent.

In testimony whereof, I have hereunto set my hand at Los Angeles, California, this 22nd day of August, 1928.

WALTER S. BAYLIS.